United States Patent
O'Riordan et al.

(10) Patent No.: US 11,586,362 B2
(45) Date of Patent: Feb. 21, 2023

(54) SYSTEM CONFIGURATION DRIFT AND COMPLIANCE MANAGEMENT

(71) Applicant: EMC IP Holding Company LLC, Hopkinton, MA (US)

(72) Inventors: Finbarr O'Riordan, Cork (IE); Audrey O'Sullivan, County Cork (IE); Tim O'Connor, Farnanes (IE); Derek Barrett, Belgooly (IE); Anna Odziemczyk, County Cork (IE); Sean Flanagan, Glounthaune (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/162,206

(22) Filed: Jan. 29, 2021

(65) Prior Publication Data
US 2022/0244868 A1 Aug. 4, 2022

(51) Int. Cl.
*G06F 3/06* (2006.01)
*G06F 11/34* (2006.01)

(52) U.S. Cl.
CPC .......... *G06F 3/0629* (2013.01); *G06F 3/0604* (2013.01); *G06F 3/0646* (2013.01); *G06F 3/0673* (2013.01); *G06F 11/3476* (2013.01)

(58) Field of Classification Search
None
See application file for complete search history.

(56) References Cited

U.S. PATENT DOCUMENTS

| 8,793,371 | B1* | 7/2014 | Nanekar | H04L 67/1097 709/224 |
|---|---|---|---|---|
| 9,378,461 | B1* | 6/2016 | Chatterjee | G06F 9/5005 |
| 10,505,805 | B1* | 12/2019 | Viswanathan | G06F 9/44505 |
| 11,349,712 | B1* | 5/2022 | Giaquinto | H04L 41/0873 |
| 2020/0344130 | A1* | 10/2020 | Moore | H04L 41/082 |
| 2021/0109672 | A1* | 4/2021 | Nagata | G06F 3/067 |

* cited by examiner

*Primary Examiner* — Edward J Dudek, Jr.
*Assistant Examiner* — Ralph A Verderamo, III
(74) *Attorney, Agent, or Firm* — Muirhead and Saturnelli, LLC

(57) ABSTRACT

A master profile may be created defining a plurality of values for a plurality of storage system parameters. The master profile may be stored and applied to a plurality of storage systems. In some embodiments, one or more values defined in the master profile may be changed and the resulting plurality of parameter values stored in a new master profile. Current values of storage system parameters may be monitored, for example, determined according to a predefined schedule or in response to user input, and the current values may be compared against the values defined in the master profiles. The results of these comparisons may be recorded as part of compliance information that indicates the extent of compliance of the parameter values of a storage system with the master profile parameter values. The compliance information may be included as part of a compliance report, notification or some other communication.

17 Claims, 3 Drawing Sheets

SYSTEM CONFIGURATION DRIFT AND COMPLIANCE MANAGEMENT

BACKGROUND

Technical Field

This application generally relates to data storage systems, and more particularly to managing storage system configurations.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a storage system is managed, including: creating a master profile for the storage system, the master profile defining a plurality of master values for a plurality of storage system parameters; applying the master profile to the storage system; determining a plurality of current values of the plurality of storage system parameters; comparing the plurality of current values to the plurality of master values; recording compliance information based on the comparison of the plurality of current values and the plurality of master values, including at least a first difference between a first of the plurality of master values and a first of the plurality of current values; and communicating the compliance information to a user. The determining may be performed according to a predefined schedule. The method further may include storing a plurality of default profiles for the storage system, each default profile defining a plurality of default values for the plurality of storage system parameters, where creating the master profile may include selecting one of the default profiles and changing one or more of the plurality of default values to produce the plurality of master values. The compliance information may be communicated to the user in response to determining the first difference between the first master value and the first current value. The compliance information may be communicated to the user in response to an instruction initiated by the user. The method further may include: communicating the master profile to another storage system; and applying the master profile to the other storage system. The method further may include maintaining a log of any changes to the values of the plurality of storage system parameters.

In other embodiments of the invention, a storage system including executable logic that implements a method is provided. The method includes: creating a master profile for the storage system, the master profile defining a plurality of master values for a plurality of storage system parameters; applying the master profile to the storage system; determining a plurality of current values of the plurality of storage system parameters; comparing the plurality of current values to the plurality of master values; recording compliance information based on the comparison of the plurality of current values and the plurality of master values, including at least a first difference between a first of the plurality of master values and a first of the plurality of current values; and communicating the compliance information to a user. The determining may be performed according to a predefined schedule. The method further may include storing a plurality of default profiles for the storage system, each default profile defining a plurality of default values for the plurality of storage system parameters, where creating the master profile may include selecting one of the default profiles and changing one or more of the plurality of default values to produce the plurality of master values. The compliance information may be communicated to the user in response to determining the first difference between the first master value and the first current value. The compliance information may be communicated to the user in response to an instruction initiated by the user. The method further may include: communicating the master profile to another storage system; and applying the master profile to the other storage system. The method further may include maintaining a log of any changes to the values of the plurality of storage system parameters.

In other embodiments of the invention, computer-readable media having software stored thereon is provided. The software includes: executable code that controls creating a master profile for the storage system, the master profile defining a plurality of master values for a plurality of storage system parameters; executable code that controls applying the master profile to the storage system; executable code that controls determining a plurality of current values of the plurality of storage system parameters; executable code that compares the plurality of current values to the plurality of master values; executable code that records compliance information based on the comparison of the plurality of current values and the plurality of master values, including at least a first difference between a first of the plurality of master values and a first of the plurality of current values; and executable code that controls communicating the compliance information to a user. The software further may include executable code that stores a plurality of default profiles for the storage system, each default profile defining a plurality of default values for the plurality of storage system parameters, where creating the master profile may include selecting one of the default profiles and changing one or more of the plurality of default values to produce the plurality of master values. The compliance information may be communicated to the user in response to determining the first difference between the first master value and the first current value. The compliance information may be communicated to the user in response to an instruction initiated by the user. The software further may include: executable code that controls communicating the master profile to another storage system; and executable code that controls applying the master profile to the other storage system. The software further may include executable code that maintains a log of any changes to the values of the plurality of storage system parameters.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Figure 1:
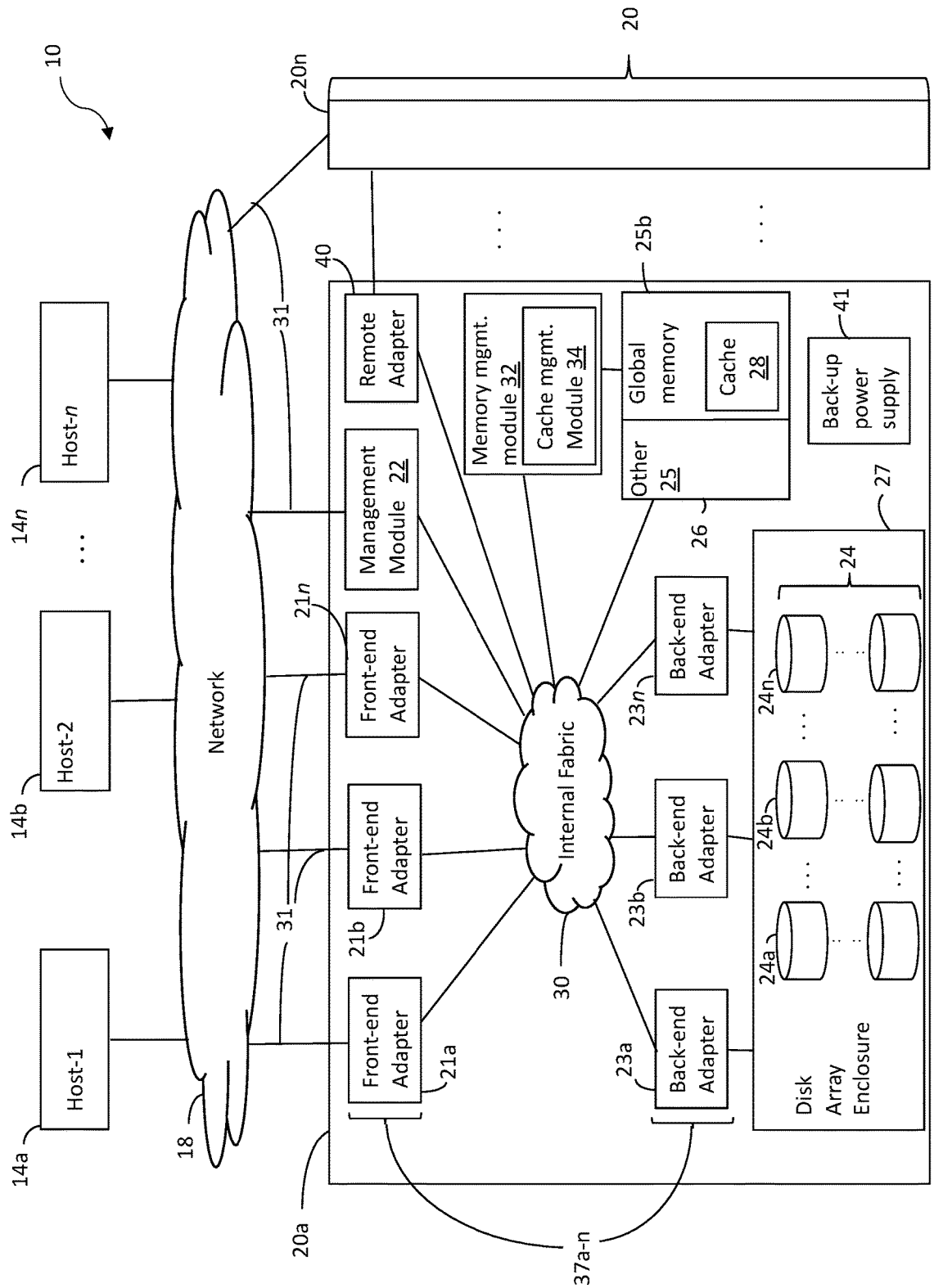
FIG. 1 is a block diagram illustrating an example of a data storage network, according to embodiments of the invention.

Storage systems may have hundreds or even thousands of configuration parameters, the defined values of which control the behavior of the storage system. At least some of these values may have default values defined during original configuration of the storage system, for example, by a vendor, independent of any customer, e.g., in a computer lab. For example, vendor personnel may manually enter configuration parameter values using software, e.g., through a user interface. This original configuration may take hours or even days. During configuration of the system for a specific customer (e.g., customization), prior to and/or following installation of the storage system within a data center (or elsewhere) on behalf of the customer, at least some of these default values may be changed based on customer input, and perhaps changed even further as a result initial testing of the system, to produce an initial system configuration for the customer ("initial customer configuration") with which the customer may go "live." This customization process adds even more time to the configuration of the system. The parameter values for the original configuration and/or initial customer configuration may be determined from a plurality of different sources, and may be manually entered using any of a plurality of different applications and/or sub-systems of the storage system.

Over time, one or more storage system configuration parameters (also referred to herein as "storage system parameters") may be changed from the values of the initial customer configuration, leading to what can be referred to as "configuration drift." These changes may be made by any of a plurality of authorized users, including one or more storage system administrators, network administrators, vendor contractors, etc., by persons with different levels of current and historical knowledge about the storage system. Some of these persons may change a parameter value with little or no understanding of why another person previously set the parameter to an earlier value, and may not have the desire or ability to communicate with the other person to determine why. One or more of these changes may result in undesirable system behaviors that impact system performance or even cause the system, or a part thereof, to fail. Determining a cause of an undesirable system behavior—e.g., the cause of a crash—may be labor intensive. An administrator may need to manually review whatever logs may be kept of parameter changes, and may need to manually reset parameters to previous values, e.g., defined in an initial customer configuration, for example, based on information available from system logs and perhaps other disparate applications, sub-systems and data sources maintained by one or more entities.

Further, it may be desirable to know at any given point in time the extent to which a current storage system configuration deviates from an initial customer configuration and/or original configuration—i.e., the extent of configuration drift. This determination also may be labor intensive for the same reasons described above with respect to determining a cause of an undesirable system behavior.

What may be desirable is a less labor-intensive way to configure a storage system, determine the extent of configuration drift, and determine the history of changes to storage system parameters.

Described herein are techniques and mechanisms to create a storage system profile, and to use the storage system profile to determine the extent of configuration drift and a history of changes to storage system parameters.

A master profile (e.g., a "gold copy") may be created, the master profile defining a plurality of values for a plurality of storage system parameters. The master profile may be implemented as a named data structure, the data structure including a plurality of entries, each entry representing a storage system parameter and including one or more values defined for the storage system parameter. The master profile may be stored and applied to a plurality of storage systems. In some embodiments, one or more values defined in the master profile may be changed and the resulting set of parameter values stored as a new master profile. It should be appreciated that applying a master profile to a storage system may include accessing and communicating with several disparate parts or sub-systems of the storage system, requiring pre-configuration of interfaces with such parts and sub-systems and/or applications configured to access such parts or sub-systems.

Current values of storage system parameters may be tracked, for example, according to a predefined schedule (e.g., hourly, daily) or in response to user input, and the current values may be compared against the values defined in the master profile. The results of these comparisons may be recorded as part of compliance information that indicates the extent of compliance of the parameter values of a storage system with the master profile parameter values. It should be appreciated that tracking the storage system parameters may include obtaining parameter values from several disparate parts or sub-systems of the storage system, requiring pre-configuration of interfaces with such parts and sub-systems and/or applications configured to access such parts or sub-systems.

The compliance information may be reported to one or more entities (e.g., storage system administrator, support contractor) according to a predefined schedule (e.g., daily, weekly) and/or in response to the compliance information including a deviation of one or more current parameter values from the respective master profile parameter values. The compliance information may be included in a compliance report according to a predefined report format. In some embodiments, the determination of a deviation may trigger the sending of a notice (e.g., an alert) to one or more persons, for example, via email, text message, visual display, sound, other mechanisms and/or any suitable combination of the foregoing.

In some embodiments, a plurality of predefined storage system profiles ("default profiles") may be stored, and one of such profiles may be selected. The selected default profile may be specified to serve as-is as a master profile for a storage system, or one or more values of the default profile parameters may be changed, and the modified default profile may serve as the master profile for the storage system. Further, in some embodiments, each time a change is made to a value of a storage system parameter, the resulting set of storage system parameter values may be saved as a profile, and potentially applied to other storage systems.

In some embodiments, one or more logs may be maintained of changes made to one or more storage system parameters. The log may specify, for each change to a given parameter: a time at which the change was made; the person who made the change; the value before the change; the value as a result of the change; the reason the change was made—e.g., which could be required to be entered by a person while making the change by a user interface; and other information. For a given parameter of a master profile, a reference (e.g., link) to a log entry for the parameter may be provided. The log entry for a parameter may be accessed in response to determining a deviation of the current parameter value from the master profile parameter value, and information from the log entry may be included in a compliance report, notification or other communication sent to one or more persons. The one or more logs may be implemented using one or more files, tables, object-oriented data structures, other types of data structures or objects, or any suitable combination of the foregoing. The one or more logs may provide an audit trail for one or more storage system configuration parameters.

In some embodiments, a storage system may be restored to the configuration defined by a master profile, for example, if it is determined that the configuration draft is too great. Such a determination may be made manually by one or more persons, or autonomously; e.g., by defining and applying logical rules. For example, a rule may specify a threshold number or percentage of master profile parameter that may be changed before a restoration to the master profile is performed; and/or may define one or more performance thresholds that if not met will trigger restoration to a master profile.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14*a-n*; network 18; one or more storage systems 20*a-n*; other components; or any suitable combination of the foregoing. Storage systems 20*a-n*, connected to host systems 14*a-n* through network 18, may collectively constitute a distributed storage system 20. All of the host computers 14*a-n* and storage systems 20*a-n* may be located at the same physical site, or, alternatively, two or more host computers 14*a-n* and/or storage systems 20*a-n* may be located at different physical locations. Storage network 10 or portions thereof (e.g., one or more storage systems 20*a-n* in combination with network 18) may be any of a variety of types of storage networks, such as, for example, a storage area network (SAN), e.g., of a data center. Embodiments of the invention are described herein in reference to storage system 20*a*, but it should be appreciated that such embodiments may be implemented using other discrete storage systems (e.g., storage system 20*n*), alone or in combination with storage system 20*a*.

The N hosts 14*a-n* may access the storage system 20*a*, for example, in performing input/output (I/O) operations or data requests, through network 18. For example, each of hosts 14*a-n* may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14*a-n* and the storage systems 20*a-n* included in the storage network 10 may be connected to the network 18 by any one of a variety of connections as may be provided and supported in accordance with the type of network 18. The processors included in the host computer systems 14*a-n* may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14*a-n* may issue an I/O request to the storage system 20*a* to perform an I/O operation. For example, an application executing on one of the host computers 14*a-n* may perform a read or write operation resulting in one or more I/O requests being transmitted to the storage system 20*a*.

Each of the storage systems 20*a-n* may be manufactured by different vendors and interconnected (not shown). Additionally, the storage systems 20*a-n* also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also may be referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

The storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Any of storage systems 20a-n, or one or more components thereof, described in relation to FIG. 1 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

In some embodiments, the configuration of a storage system (e.g., the storage system 20a) may be managed, as will now be described.

Figure 2:
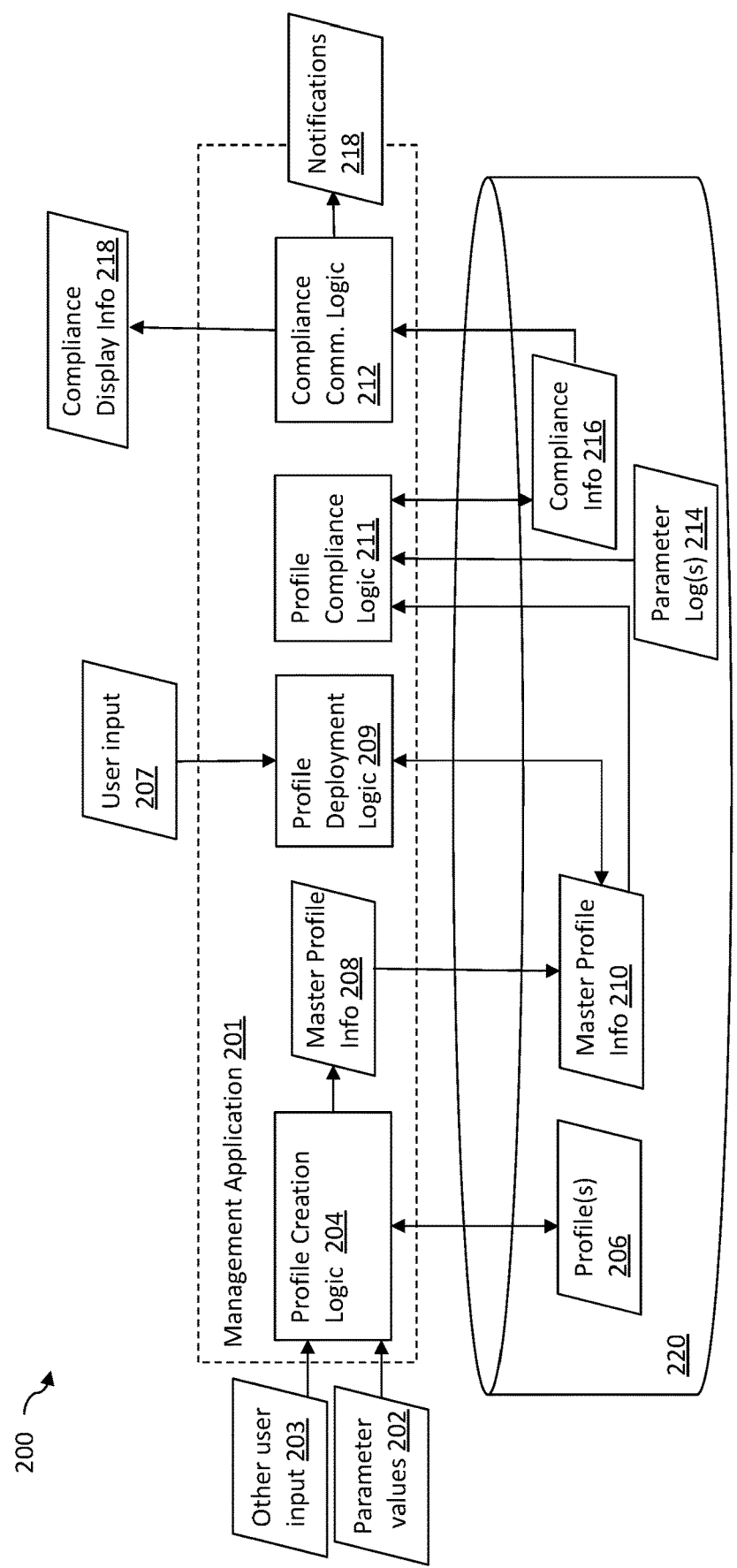
FIG. 2 is a block diagram illustrating an example of a system for managing the configuration of a storage system, according to embodiments of the invention.

FIG. 2 is a block diagram illustrating an example of a system 200 for managing the configuration of a storage system, according to embodiments of the invention. Other embodiments of a system for managing the configuration of a storage system, for example, variations of the system 200, are possible and are intended to fall within the scope of the invention. The system 200 may be implemented as part of the storage system 20a.

The system 200 may include any of: a profile creation logic 204, profile deployment logic 219, profile compliance logic 211, compliance communication logic 212, data storage 220 (e.g., one or more physical storage devices 24a-n), other components or any suitable combination of the foregoing. Each of the profile creation logic 204, profile deployment logic 209, profile compliance logic 211 and compliance communication logic 212 may be configured with parameter values (not shown). The profile creation logic 204, profile deployment logic 209, profile compliance logic 211 and compliance communication logic 212 each may be separate and discrete logical and/or physical components, or two or more of them may be integrated in a single logical and/or physical component, for example, a management application 201. The management application 201, or one or more components thereof, may be implemented as part of the management module 22 of the storage system 20a; which may be, include, or be included as part of, a service processor of a Symmetrix or VMAX storage system, and/or may be, include, or be included as part of, a management module control station (MMCS) of a VMAX3 or PowerMax storage system.

The management application 201, or one or more components thereof (e.g., 204, 209, 211, 212) may be implemented using any of a plurality of software configurations. For example, in some embodiments, the management application 201 may include one or more server components that provide storage system management logic and APIs (e.g., symapi for a Symmetrix, VMAX, VMAX3 or PowerMax storage system) utilized by one or more client components, e.g., Solutions Enabler or Unisphere made available by EMC Corporation. For example, the server component of the management application may reside on the storage system itself, for example, as part of the management module 22, or may be a stand-alone server that may be part of the same data storage network as the one or more storage systems for which it enables storage management services; and one or more client components may reside on hosts (e.g., 14a-n) of a storage network, where each such host may include other applications that utilize storage systems for data services or may be a stand-alone host for storage management. In some embodiments, the data storage 220 or a portion thereof may include storage provided by a stand-alone management server or one or more hosts in addition to, or as an alternative to, physical storage devices of one or more storage systems.

The profile creation logic 202 may be configured to retrieve one or more profiles (e.g., default profiles) 206 from the data storage 220, and receive parameter values 202 and other input 203 from a user (e.g., through a user interface). The profile creation logic 204 may be configured to create a master profile, and to send master profile information 208 (including the master profile itself) to the data storage 220 to be persisted as the master profile information 210. The other user input 203 may include instructions to save a modified profile as a master profile, a name of the new master profile and other information about the new master profile. It should be appreciated that, in some cases, no changes may be specified (e.g., no parameter values 202 received) for a profile 206 retrieved from the data storage 220, and the created master profile may have the same parameter values as the profile 206 retrieved.

The profile deployment logic 209 may be configured to receive user input 207, retrieve master profile information 210 corresponding to the user input, and deploy (e.g., apply) the master profile specified in the master profile to one or more storage systems (e.g., 20a-n) in accordance with the user input 207. The user input 207 may specify a master profile ID (e.g., name) and one or more storage system IDs. One of the storage systems may include one or more components of the system 200 and/or parts thereof, and one or more others of the storage systems may be part of separate systems altogether. Deploying a master profile may include communicating with a storage system over one or more networks (e.g., the network 18). It should be appreciated that applying the master profile to each storage system may include accessing and communicating with several disparate parts or sub-systems of the storage system. The profile deployment logic 209 may be configured to interface with such parts and sub-systems and/or with applications configured to access such parts or sub-systems. For example, such parts, sub-systems and/or applications may expose programming interfaces, and the profile deployment logic 209 may be configured (e.g., in software) to utilize such programming interfaces to set storage system parameter values.

The profile compliance logic 211 may be configured to determine an extent to which a storage system is complying with, or drifting from, a master profile of the storage system. The profile compliance logic 211 may be configured to retrieve master profile information 210, including a master profile, obtain (e.g., retrieve) current values of storage system parameters, and compare the values of the master profile parameters to the current values of the parameters for the storage system. The profile compliance logic 211 may store the results of these comparisons as compliance information 215. The comparison results may include deviations of the current parameter values from the master profile parameter values. It should be appreciated that obtaining current values of storage system parameters may include accessing and communicating with several disparate parts or sub-systems of the storage system. The profile compliance logic 211 may be configured to interface with such parts and sub-systems and/or with applications configured to access such parts or sub-systems. For example, such parts, sub-systems and/or applications may expose programming interfaces, and the profile compliance logic 211 may be configured (e.g., in software) to utilize such programming interfaces to access storage system parameter values.

The profile compliance logic 211 also may be configured to access parameter logs 214, for example, in response to determining a deviation of the current parameter values from the master profile parameter values. The parameter logs may specify, for each change to a given parameter: a time at which the change was made; the person who made the change; the value before the change; the value as a result of the change; the reason the change was made—e.g., which could be required to be entered by a person while making the change by a user interface; and other information.

In response to determining a deviation of the current parameter values from the master profile parameter values, the profile compliance logic 211 may provide a reference (e.g., link) in the compliance information 216 for the parameter to the log for the parameter. In addition to, or as an alternative to, providing a reference, the profile compliance logic 211 may access the log for the parameter, extract log information about the parameter and add the log information to the compliance information 216 specific to the parameter.

The profile compliance logic 211 may be configured to compare parameter values according to a predefined schedule (e.g., hourly, daily, weekly) and/or in response to an event, for example, user input.

The compliance communications logic 212 may be configured to access compliance information 216, and communicate compliance display information 218 and/or notifications 218 derived from the compliance information. For example, the compliance communications logic 212 may be configured to report the compliance display information 218 to one or more entities (e.g., storage system administrator, support contractor) according to a predefined schedule (e.g., daily, weekly) and/or in response to the compliance information including a deviation of the current parameter values from the master profile parameter values. The compliance display information 218 may be included in a compliance report according to a predefined report format. The compliance report may highlight (e.g., flag) any deviations from mater profile parameter values. In some embodiments, the determination of a deviation may trigger the sending of a notification 218 (e.g., an alert) to one or more persons, for example, via email, text message, visual display, sound, other mechanisms and/or any suitable combination of the foregoing.

Figure 3:
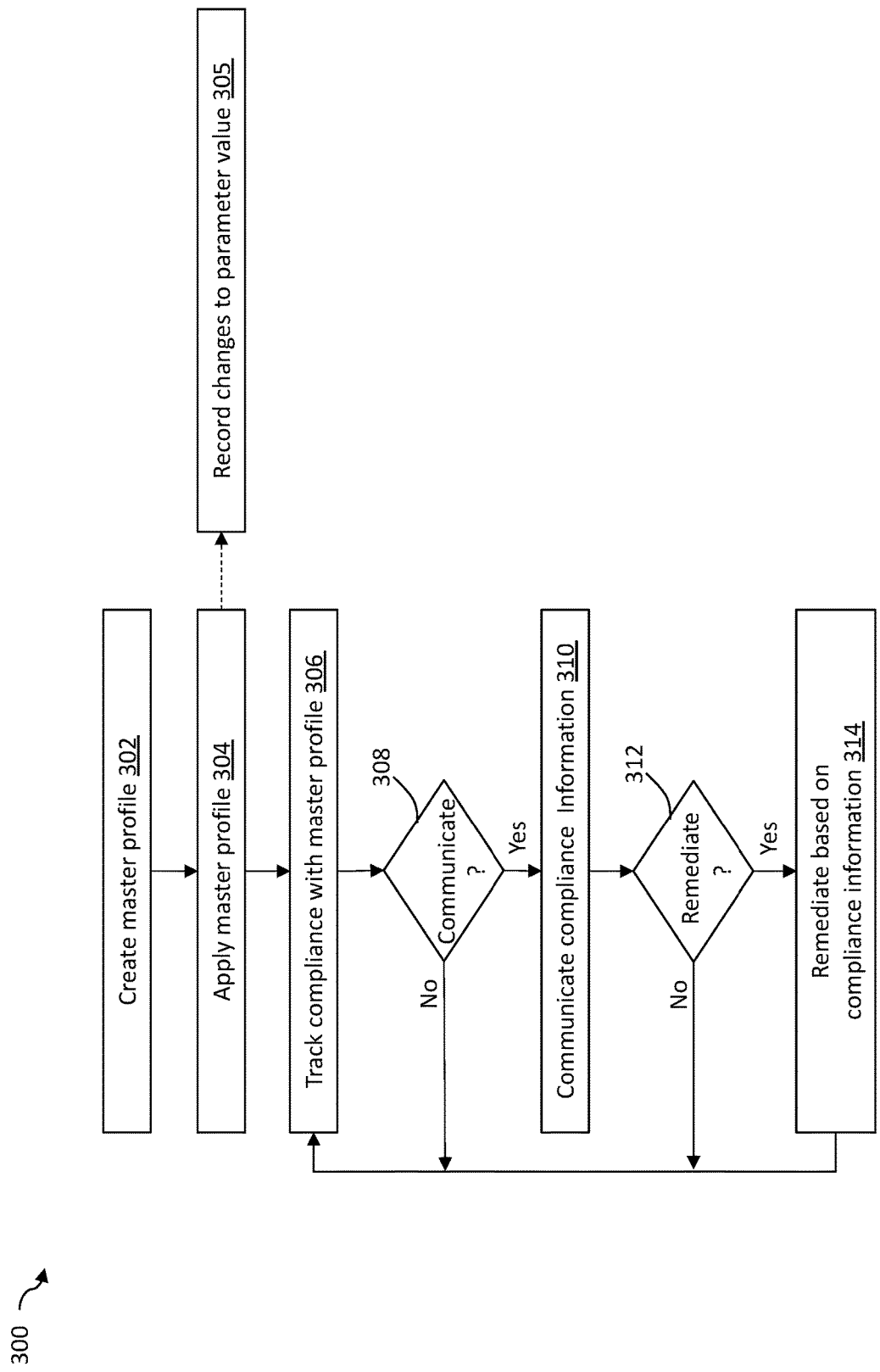
FIG. 3 is a block diagram illustrating an example of a method of managing the configuration of a storage system, according to embodiments of the invention.

FIG. 3 is a block diagram illustrating an example of a method 300 for managing the configuration of a storage system, according to embodiments of the invention. Other embodiments of a method of managing the configuration of a storage system, for example, variations of the method 300, are possible and are intended to fall within the scope of the invention. The method 300 may be implemented by the system 200 described in more detail elsewhere herein.

In a step 302, a master profile may be created, for example, as described in more detail elsewhere herein. Creating the master profile may include accessing a default profile, perhaps making changes to parameter values of the default profile, and naming and storing the master profile. The step 204 may be performed by the profile creation logic 204.

In a step 304, the master profile may be applied to one or more storage systems, for example, as described in more detail elsewhere herein. After applying the master profile, and perhaps concurrently to performance of the steps 306-314, changes to parameter values on a storage system may be recorded in a step 305, along with other information about the change, for example, in one or more parameter logs, as described in more detail elsewhere herein. A parameter log may be implemented as a file, table, object-oriented data structure or other type of data structure or object.

In a step 306, the extent of compliance with, and/or extent of drift away from, a master profile may be tracked, for example, by comparing master profile parameter values with current values of the parameters according to a predefined schedule and/or in response to an event (e.g., user input), for example, as described in more detail elsewhere herein. Tracking also may include recording compliance information, including any deviations of the current parameter values from the master profile parameter values, for example, as described in more detail elsewhere herein. It should be appreciated that recording compliance information also may include indicating when a current value or a parameter is the same as the value of the parameter in the master profile. The compliance information may include log information, or a link to same, for parameters for which there is determined to be a deviation.

In a step 308, it may be determined whether to communicate compliance information to one or more persons. For example, it may be determined whether it is time to communicate a compliance report according to a predetermined schedule, or whether the system has received a request or instruction to communicate the compliance communication. It also may be determined whether the system is configured to notify (e.g., send an alert to) one or more persons based on the degree of configuration drift (e.g., an amount or percentage of parameters whose values have change from master profile values) or in response to a change to a specific parameter value, as described in more detail elsewhere herein. For example, one or more communication parameter values and/or rules may specify whether such notifications should be sent and under what conditions.

If it determined that compliance information is not to be communicated at the current time, the method 300 may return to the step 306. Otherwise, the compliance information, including notifications (e.g., alerts) may be communicated in a step 310, for example, as described in more detail elsewhere herein.

In a step 312, it may be determined whether one or remediation steps may be performed, for example, in response to determined compliance information, or, more specifically, in response to compliance information communicated in the step 310. Such a determination may require instruction from a user (e.g., storage system administrator) or may be automated by predefined rules. If it determined that remediation is to not to be performed, the method 300 may return to the step 306. Otherwise, in a step 314, one or more remediations steps may be performed. Remediation may include changing one or more parameter values, for example, to the values specified in the master profile, reverting the configuration of a storage system to a master profile, or reverting to another previous configuration (e.g., based at least in part on information obtained from parameter logs).

Managing the configuration of storage systems as described herein, including the creation of master profiles, tracking compliance with the master profiles and communicating compliance with (or drift from) the master profile may reduce (perhaps significantly) the labor intensity commonly associated with these tasks.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 300, or parts thereof, may be implemented using one or more of the systems and/or data structures described in relation to FIGS. 1-2, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate operating system.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing a storage system, the method comprising:
   creating a master profile for the storage system, the master profile defining a plurality of master values for a plurality of storage system parameters;
   applying the master profile to the storage system;
   determining a plurality of current values of the plurality of storage system parameters;
   comparing the plurality of current values to the plurality of master values;
   maintaining a log recording changes to the plurality of storage system parameters, wherein the log provides an audit trail of changes made over time to the plurality of storage system parameters, wherein responsive to a first change made to a first of the plurality of storage system parameters, said maintaining includes:
      recording in the log a first log entry regarding the first change made to the first storage system parameter from a first of the plurality of master values to a first of the plurality of current values, wherein the first log entry identifies the first storage system parameter, the first master value, the first current value, a particular user, and a particular time and wherein the first entry denotes that the first change is made by the particular user at the particular time;
   recording compliance information based on the comparison of the plurality of current values and the plurality of master values, including at least a first difference between the first master value and the first current value for the first storage system parameter, wherein the compliance information includes a link or reference associated with the first difference, wherein the link or reference references the first log entry;
   communicating the compliance information to a user, wherein the user accesses the first log entry using the link or reference included in the compliance information;
   determining, in accordance with a rule, whether the first difference between the first master value and the first current value for the first storage system parameter exceeds a specified threshold, wherein the rule includes the specified threshold; and
   responsive to determining that the first difference exceeds the specified threshold, performing one or more remediations for the storage system, said one or more remediations including restoring the first storage system parameter from the first current value to the first master value of the master profile.

2. The method of claim 1, wherein the determining is performed according to a predefined schedule.

3. The method of claim 1, further comprising:
   storing a plurality of default profiles for the storage system, each default profile defining a plurality of default values for the plurality of storage system parameters,
   wherein creating the master profile includes selecting one of the default profiles and changing one or more of the plurality of default values to produce the plurality of master values.

4. The method of claim 1, wherein the compliance information is communicated to the user in response to determining the first difference between the first master value and the first current value.

5. The method of claim 1, wherein the compliance information is communicated to the user in response to an instruction initiated by the user.

6. The method of claim 1, further comprising:
   communicating the master profile to another storage system; and
   applying the master profile to the other storage system.

7. A storage system comprising executable logic that implements a method including:
   creating a master profile for the storage system, the master profile defining a plurality of master values for a plurality of storage system parameters;
   applying the master profile to the storage system;
   determining a plurality of current values of the plurality of storage system parameters;
   comparing the plurality of current values to the plurality of master values;
   maintaining a log recording changes to the plurality of storage system parameters, wherein the log provides an audit trail of changes made over time to the plurality of storage system parameters, wherein responsive to a first change made to a first of the plurality of storage system parameters, said maintaining includes:
      recording in the log a first log entry regarding the first change made to the first storage system parameter from a first of the plurality of master values to a first of the plurality of current values, wherein the first log entry identifies the first storage system parameter, the first master value, the first current value, a particular user, and a particular time and wherein the first entry denotes that the first change is made by the particular user at the particular time;
   recording compliance information based on the comparison of the plurality of current values and the plurality of master values, including at least a first difference between the first master value and the first current value for the first storage system parameter, wherein the compliance information includes a link or reference associated with the first difference, wherein the link or reference references the first log entry;
   communicating the compliance information to a user, wherein the user accesses the first log entry using the link or reference included in the compliance information;
   determining, in accordance with a rule, whether the first difference between the first master value and the first current value for the first storage system parameter exceeds a specified threshold, wherein the rule includes the specified threshold; and responsive to determining that the first difference exceeds the specified threshold, performing one or more remediations for the storage system, said one or more remediations including restoring the first storage system parameter from the first current value to the first master value of the master profile.

8. The storage system of claim 7, wherein the determining is performed according to a predefined schedule.

9. The storage system of claim 7, wherein the method further comprises:

storing a plurality of default profiles for the storage system, each default profile defining a plurality of default values for the plurality of storage system parameters, wherein creating the master profile includes selecting one of the default profiles and changing one or more of the plurality of default values to produce the plurality of master values.

10. The storage system of claim 7, wherein the compliance information is communicated to the user in response to determining the first difference between the first master value and the first current value.

11. The storage system of claim 7, wherein the compliance information is communicated to the user in response to an instruction initiated by the user.

12. The storage system of claim 7, wherein the method further includes:

communicating the master profile to another storage system; and applying the master profile to the other storage system.

13. One or more non-transitory computer-readable media having software stored thereon, the software comprising:

executable code that controls creating a master profile for the storage system, the master profile defining a plurality of master values for a plurality of storage system parameters;

executable code that controls applying the master profile to the storage system;

executable code that controls determining a plurality of current values of the plurality of storage system parameters;

executable code that compares the plurality of current values to the plurality of master values;

executable code that maintains a log recording changes to the plurality of storage system parameters, wherein the log provides an audit trail of changes made over time to the plurality of storage system parameters, wherein the executable code that maintains the log further includes:

executable code that, responsive to a first change made to a first of the plurality of storage system parameters, records in the log a first log entry regarding the first change made to the first storage system parameter from a first of the plurality of master values to a first of the plurality of current values, wherein the first log entry identifies the first storage system parameter, the first master value, the first current value, a particular user, and a particular time and wherein the first entry denotes that the first change is made by the particular user at the particular time;

executable code that records compliance information based on the comparison of the plurality of current values and the plurality of master values, including at least a first difference between the first master value and the first current value for the first storage system parameter, wherein the compliance information recorded includes a link or reference associated with the first difference and wherein the link or reference references the first log entry;

executable code that controls communicating the compliance information to a user, wherein the link or reference of the compliance information is used by the user to access the first log entry;

executable code that determines, in accordance with a rule, whether the first difference between the first master value and the first current value for the first storage system parameter exceeds a specified threshold, wherein the rule includes the specified threshold; and executable code that, responsive to determining that the first difference exceeds the specified threshold, controls performing one or more remediations for the storage system, said one or more remediations including restoring the first storage system parameter from the first current value to the first master value of the master profile.

14. The one or more non-transitory computer-readable media of claim 13, wherein the software further comprises:

executable code that stores a plurality of default profiles for the storage system, each default profile defining a plurality of default values for the plurality of storage system parameters, wherein creating the master profile includes selecting one of the default profiles and changing one or more of the plurality of default values to produce the plurality of master values.

15. The one or more non-transitory computer-readable media of claim 13, wherein the compliance information is communicated to the user in response to determining the first difference between the first master value and the first current value.

16. The one or more non-transitory computer-readable media of claim 13, wherein the compliance information is communicated to the user in response to an instruction initiated by the user.

17. The one or more non-transitory computer-readable media of claim 13, wherein the software further comprises:

executable code that controls communicating the master profile to another storage system; and executable code that controls applying the master profile to the other storage system.

* * * * *